(12) United States Patent
Spring et al.

(10) Patent No.: US 8,547,856 B2
(45) Date of Patent: Oct. 1, 2013

(54) COMMUNICATION SYSTEM WITH STATE DEPENDENT PARAMETERS

(75) Inventors: Maximilian Spring, San Jose, CA (US); Shmuel Shaffer, Palo Alto, CA (US); Eric Cozzi, Hayward, CA (US); Steven Christenson, Campbell, CA (US)

(73) Assignee: Cisco Technology, Inc., San Jose, CA (US)

( * ) Notice: Subject to any disclaimer, the term of this patent is extended or adjusted under 35 U.S.C. 154(b) by 1087 days.

(21) Appl. No.: 11/842,497

(22) Filed: Aug. 21, 2007

(65) Prior Publication Data

US 2009/0052339 A1    Feb. 26, 2009

(51) Int. Cl.
G01R 31/08 (2006.01)
H04M 11/04 (2006.01)
H04M 1/00 (2006.01)
H04W 24/00 (2009.01)

(52) U.S. Cl.
USPC ............. 370/252; 455/404.1; 455/456.1; 455/575.1

(58) Field of Classification Search
USPC .......................................... 370/252
See application file for complete search history.

(56) References Cited

U.S. PATENT DOCUMENTS

| | | | |
|---|---|---|---|
| 5,922,050 A * | 7/1999 | Madany | 709/222 |
| 6,058,164 A * | 5/2000 | Ibuka et al. | 379/67.1 |
| 6,271,893 B1 | 8/2001 | Kawaguchi et al. | |
| 6,339,706 B1 * | 1/2002 | Tillgren et al. | 455/419 |
| 6,445,679 B1 | 9/2002 | Taniguchi et al. | |
| 6,542,759 B1 * | 4/2003 | Fujiki et al. | 455/575.1 |
| 6,694,247 B2 * | 2/2004 | Hameleers et al. | 701/117 |
| 6,763,040 B1 * | 7/2004 | Hite et al. | 370/522 |
| 7,003,525 B1 | 2/2006 | Horvitz et al. | |
| 2002/0136217 A1 * | 9/2002 | Christensen | 370/393 |
| 2003/0021423 A1 * | 1/2003 | Wood | 381/18 |
| 2003/0216134 A1 * | 11/2003 | Mutoh | 455/404.1 |
| 2004/0083101 A1 | 4/2004 | Brown et al. | |
| 2005/0021713 A1 * | 1/2005 | Dugan et al. | 709/223 |
| 2005/0256615 A1 * | 11/2005 | Wang et al. | 701/1 |
| 2006/0003740 A1 * | 1/2006 | Munje | 455/412.1 |
| 2006/0159109 A1 * | 7/2006 | Lamkin et al. | 370/401 |
| 2006/0271658 A1 | 11/2006 | Beliles | |
| 2007/0047479 A1 * | 3/2007 | Shaffer et al. | 370/328 |
| 2007/0270122 A1 * | 11/2007 | Ewell, Jr. | 455/404.2 |

FOREIGN PATENT DOCUMENTS

| | | |
|---|---|---|
| EP | 0926895 | 6/1999 |
| EP | 1357756 | 10/2003 |
| WO | WO 2006/127786 | 11/2006 |
| WO | WO 2009/026058 | 2/2009 |

OTHER PUBLICATIONS

U.S. Appl. No. 11/761,799, filed Jun. 12, 2007, Steven Christenson, et al.

(Continued)

*Primary Examiner* — Brandon Renner
(74) *Attorney, Agent, or Firm* — Patent Capital Group

(57) ABSTRACT

In one embodiment, an apparatus can include: a status detector configured to determine a status associated with an input stream; a parameter controller configured to adjust a parameter in response to a change in the status; and a rendering controller configured to receive the input stream, and to provide a rendered stream in response to the input stream and the parameter.

22 Claims, 5 Drawing Sheets

(56) References Cited

OTHER PUBLICATIONS

H. Schulzrinne, et al., "RTP Payload for DTMF Digits, Telephony Tones and Telephony Signals," Aquired at: http://www.ietf.org/rfc/rfc2833.txt, Network Working Group, Request for Comments: 2833, Category: Standards Track, May 2000, 29 pages.

H. Schulzrinne, et al., "RTP Payload for DTMF Digits, Telephony Tones, and Telephony Signals", Aquired at: http://www.ietf.org/rfc/rfc4733.txt, Network Working Group, Request for Comments: 4733, Obsoletes: 2833, Category: Standards Track, Dec. 2006, 46 pages.

C. Perkins, et al., "RTP Payload for Redundant Audio Data", Aquired at: http://www.ietf.org/rfc/rfc2198.txt, Network Working, Request for Comments: 2198, Category: Standards Track, Sep. 1997, 11 pages.

H. Schulzrinne, et al., "RTP: A Transport Protocol for Real-Time Applications", Aquired at: http://www.ietf.org/rfc/rfc3550.txt, Network Working Group, Request for Comments: 3550, Obsoletes: 1889, Category: Standards Track, Jul. 2003.

PCT International Search Report mailed Feb. 2, 2009 for PCT/US2008/072949; 2 pages.

PCT International Preliminary Report on Patentability and Written Opinion of the International Searching Authority mailed Feb. 24, 2010 for PCT/US2008/072949; 6 pages.

* cited by examiner

COMMUNICATION SYSTEM WITH STATE DEPENDENT PARAMETERS

TECHNICAL FIELD

The present disclosure relates generally to communication systems, and to control of parameters associated therewith.

BACKGROUND

Replay functionality can enable users of a virtual talk group (VTG), or a communication channel to replay the last few voice "spurts" rendered on any VTG or channel. For systems including multiple VTGs, a main VTG and a secondary VTG may be positioned spatially in order to facilitate participation.

DESCRIPTION OF EXAMPLE EMBODIMENTS

Overview

Figure 1:
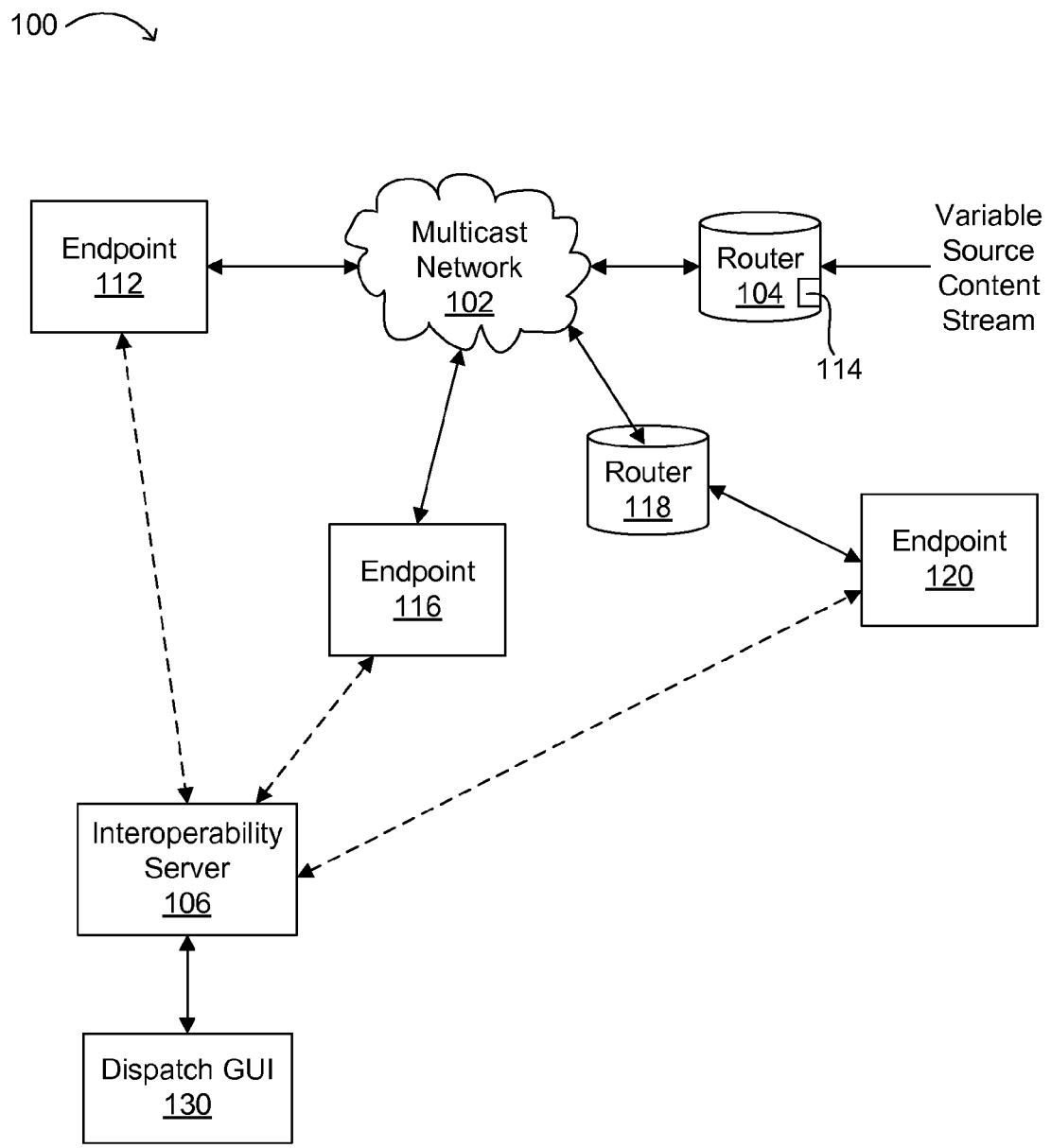
FIG. 1 illustrates an example variable source content stream and multicast network system.

In one embodiment, an apparatus can include: a status detector configured to determine a status associated with an input stream; a parameter controller configured to adjust a parameter in response to a change in the status; and a rendering controller configured to receive the input stream, and to provide a rendered stream in response to the input stream and the parameter.

In one embodiment, a method can include: receiving an input stream in an endpoint; adjusting a parameter when a status associated with the input stream changes; and providing a rendered stream in response to the input stream and the parameter.

In one embodiment, a system can include: a plurality of endpoints coupled via a network; and an interoperability server coupled to each of the plurality of endpoints, where at least one of the endpoints comprises: a status detector configured to determine a status associated with an input stream; a parameter controller configured to adjust a parameter in response to a change in the status; and a rendering controller configured to receive the input stream, and to provide a rendered stream in response to the input stream and the parameter.

Example Embodiments

In particular embodiments, automatic adjustment of parameters in a communication system in response to ongoing state changes can be accommodated. Such "parameters" can be any controllable variable related to a media rendering of an input stream, where such media rendering may be perceptible by a user. Generally, parameters may be locally controlled in an endpoint, as will be discussed in more detail below. For example, parameters can include volume settings, stereo settings, panning, pitch, frequency filters, reverberation, fading, or any other suitable rendering variable. Further, a "status" can be another variable that is generally associated with the input stream, where such status may convey a level of importance to be placed on the input stream by an endpoint or end user receiving that input stream. In some cases, the status may be controllable by an entity other than an endpoint receiving the input stream. In particular embodiments, a status associated with an input stream can also be utilized to determine when a rendered stream (e.g., a generated version of that input stream) is to be modified (e.g., via a parameter change) in particular embodiments. For example, such status variables can include a voice identification, an emergency indication, or a detected user action (e.g., a user invoking a voice replay buffer).

Virtual talk groups (VTGs), push-to-talk (PTT) channels, or any suitable conferencing and/or communication system involving multiple participants can be accommodated in particular embodiments. Generally, secondary participants or participants in secondary VTGs may often be required to alter the parameters of their communication system in response to changing environments. In particular embodiments, two general sets of parameter groupings may be one for use with primary activities, and another for secondary functions, where "primary" and "secondary" may be general status classifications. However, other status classifications can also be defined or configured in particular embodiments.

Particular embodiments can utilize state or status transitions/changes to determine whether users are functioning as primary or secondary participants with regard to a given content (e.g., media content) stream. Further, users may function as primary participants in some communication channels (e.g., VTGs), while simultaneously acting as secondary participants in other communication channels and/or VTGs.

Referring now to FIG. 1, an example variable source content stream and multicast network system is shown and indicated by the general reference character 100. In this example, multicast network 102 can interface with routers 104 and 118, as well as endpoints 112 and 116. Also, router 118 can interface with endpoint 120 and multicast network 102. Interoperability server 106 may provide configuration information to each of endpoints 112, 116, and 120. For example, such configuration information can include endpoint access rules, and may be provided via a multicast network 102, or through separate paths. Router 104 may also be equipped with or coupled to gateway 114 for conversion between a variable source content stream and Internet protocol (IP). For example, gateway 114 may be a land mobile radio gateway (LMRG). In addition, dispatch graphical user interface (GUI) 130 can accommodate administrator or dispatch control inputs to interoperability server 106.

One particular example of interoperability server 106 is the IP Interoperability and Collaboration System (IPICS) from Cisco Systems, Inc. Such an IPICS can provide a relatively simple and scalable solution for communications interoperability and distributed incident management by bridging radio, IP, and non-IP networks, thus accommodating different network types in an interoperable system. In this approach, sending radio traffic over an IP network can allow direct communication with other radios, fixed or mobile phones, and PCs.

A variable source content stream can be any appropriate data stream (e.g., IP TV, or radio). Also, endpoints 112, 116, and 120 may be any suitable endpoint structures, such as devices configured with an IP application (e.g., a software program that allows IP-based communication, such as voice over IP (VoIP)), VTG, and/or PTT management centers or clients. In an audio-based example, certain endpoints may not be allowed to hear a particular stream, which may be provided via the same "pipe" containing the variable source content stream, and disseminated via multicast network 102. Also, other endpoints (not shown) may also be coupled to any of endpoints 112, 116, and 120 via unicast networks, as opposed to via multicast network 102. Generally, particular embodiments can be utilized for any content that can flow in a multicast network or similar such distribution mechanism (e.g., a conferencing system).

In particular embodiments, users can deploy "controlled" radio solutions where the radio can be changed to one of many over-the-air frequencies at any given time. The output of the radio may then be a single multicast stream corresponding to the selected source frequency. Some listeners may have permission to select which of the over-the-air frequencies are streamed. However, such a change initiated from permissible listeners can affect all other listeners due to the sharing of the variable source content stream. Stream selection can also be based on phase lock (PL) tone, talk group, unit ID, digital coded squelch (DCS), continuous tone-coded squelch system (CTCSS), or any suitable selection determinant.

A device in particular embodiments can determine when a secondary participant or stream may be elevated to primary status. In addition, such a device can adjust a parameter (e.g., volume of rendered audio) to accommodate such a status change associated with a content stream. For example, content streams may utilize real-time transport protocol (RTP), which may be disseminated via multicast network 102 to other endpoints when a user selects a channel associated with a multicast address. In addition, encoding of content streams (e.g., utilizing G.711 or G.729, or any encoding suitable in VoIP, or other appropriate applications) can also be accommodated in particular embodiments.

Figure 2:
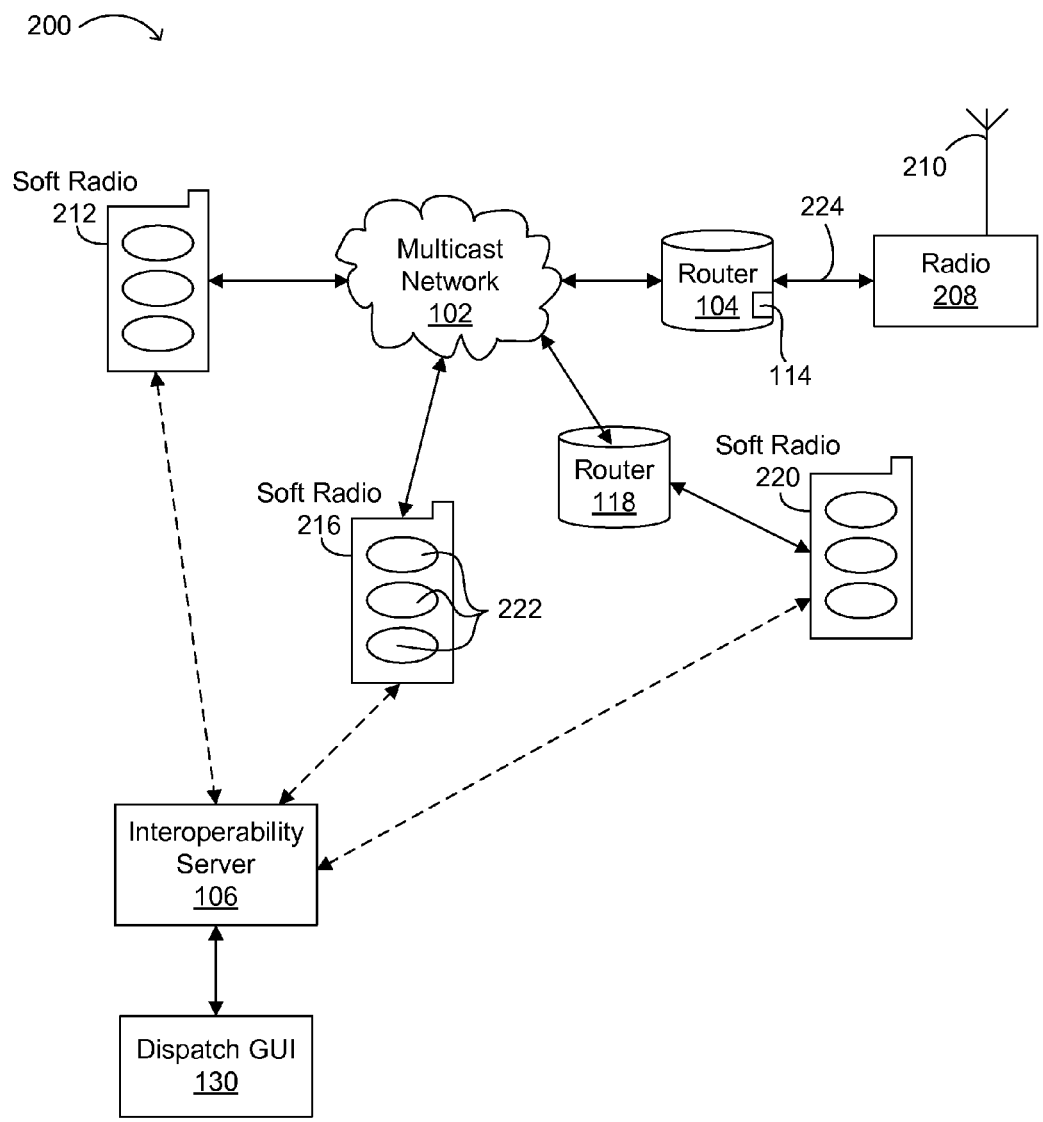
FIG. 2 illustrates an example radio application using a multicast network.

Referring now to FIG. 2, an example radio application using a multicast network is shown and indicated by the general reference character 200. In this particular example, the endpoints may be devices configured using an IP application to operate as or support soft radios (e.g., 212, 216, and 220). For example, each such soft radio can include channel indications 222. As shown, soft radios 212, 216, and 220 can also interface with interoperability server 106, and multicast network 102 can interface with routers 104 and 118. Also, dispatch GUI 130 can interface with interoperability server 106. Radio 208 may be a physical base station radio with antenna 210. Audio from radio 208 can pass over a single line or connection (e.g., content stream 224) through router 104. For example, router 104 can include or be coupled to LMRG 114 for conversion from content stream 224 to IP signaling.

Different channels (e.g., 222) are shown in each soft radio (e.g., 216), whereby each channel can be turned on/off. Typically, a given radio can be tuned to the current channel, as selected by another radio on multicast network 102. Further, any suitable controllable device can be used in place of radio 208. For example, a TV tuner for video on demand (VOD), or any other device capable of providing a variable source content stream can be accommodated. In addition, interoperability server 106 may provide configuration information, and can define channel availability from radio 208.

Audio signals can arrive in a soft radio on a multicast address associated with a particular channel, and analog signals can be sent to radio 208 for transmission (e.g., to another radio). In particular embodiments, status detection can be performed on a per-channel basis. Also, a user can configure a soft radio to provide rendered audio in stereo (e.g., left and right channels). Thus, if the user performs an action, or any other status change is detected to make an audio stream primary, a parameter adjustment can be made in the soft radio to provide a different audio setting. In this fashion, a status change associated with a content stream can result in a corresponding audio setting change noticeable by the user.

In particular embodiments, soft radios can include voice replay buffers (e.g., including a most recent predetermined period of streamed audio), and the user may be able to replay old (i.e., not live) audio. This action of invoking a voice replay buffer can be a status change consistent with enhancing the importance to the user of that old audio. Thus, the replayed (primary) audio may be given more importance than live audio (secondary). As such, particular embodiments can allow for an automatic attenuation of the live audio and/or an increase in a volume setting for the replayed audio in order to give priority to the replayed audio.

In particular embodiments, "talker ID" associated with a content stream can also be utilized to convey a status change. For example, when a SWAT team commander takes control of audio over a multicast network, talker ID may be utilized to give priority to the commander's voice in each associated soft radio. Such talker ID may be an attribute loaded with the media or content stream, and can simultaneously be provided with the voice stream by utilizing "in-band" controls). In this fashion, talker ID from a particular endpoint can be identified and given priority in other endpoints where appropriate.

In particular embodiments, in-band controls (e.g., for talker ID) can utilize Internet Engineering Task Force (IETF) Request for Comments (RFC) 2833 and/or 4733, as well as RFC 2198. For example, control sequences may utilize RFC 2833/4733 embedded within RFC 2198 payloads. Alternatively, RFC 3550 relating to real-time transport control protocol (RTCP) may also be used to accommodate talker ID functionality in particular embodiments.

Figure 3:
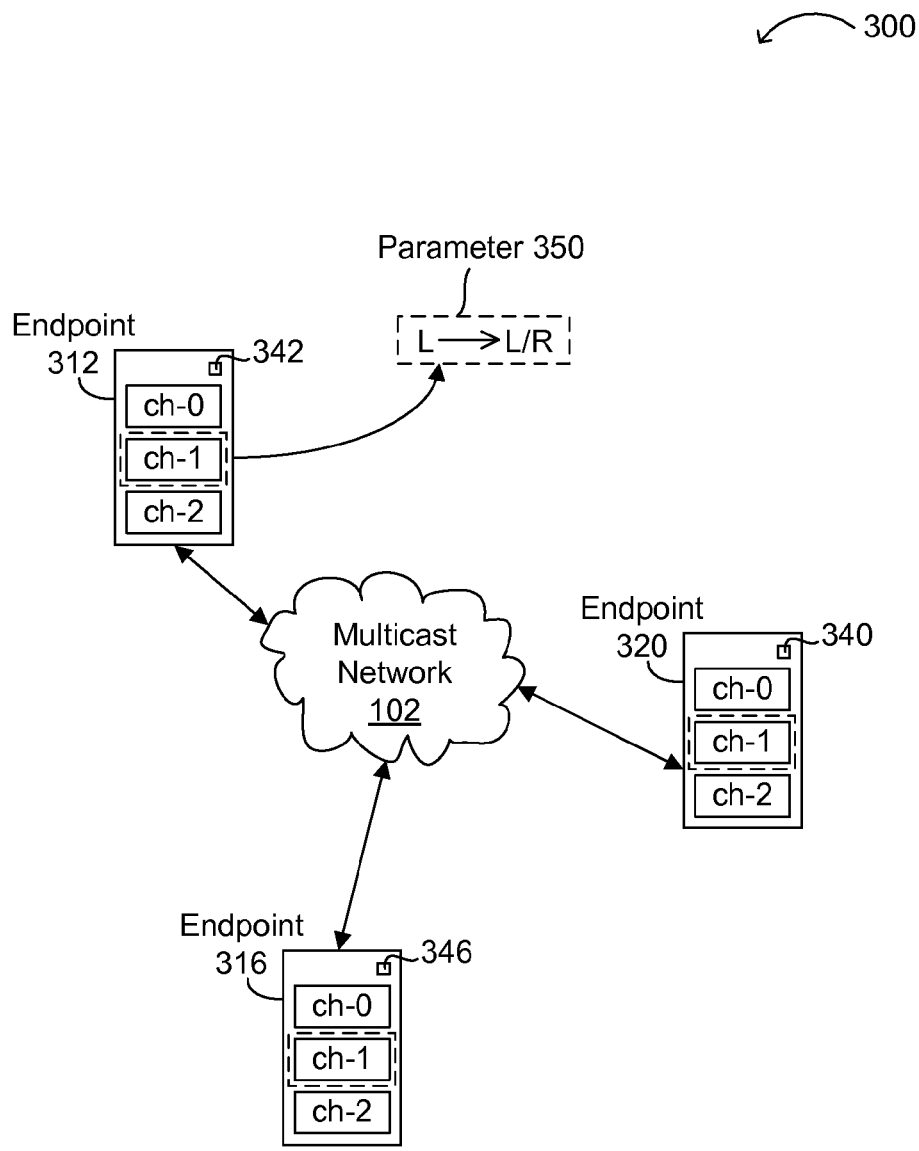
FIG. 3 illustrates an example radio parameter change in response to an emergency indication.

Referring now to FIG. 3, an example radio parameter change in response to an emergency indication is shown (300). Each of endpoints 312, 316, and 320 can include channel indications (e.g., ch-0, ch-1, and ch-2), and may interface via multicast network 102. In addition, each endpoint can include an emergency control (e.g., button 342 for endpoint 312, button 346 for endpoint 316, and button 340 for endpoint 320). For example, users may be tuned to "ch-1" when an emergency indication is provided by endpoint 320 (e.g., by depressing emergency button 340), and a parameter change (e.g., 350) can occur at endpoint 312 in response. Thus, a user at endpoint 320 can indicate an emergency situation by depressing button 340, and this can result in a parameter change from left-only audio on ch-1 to full stereo (left/right) at endpoint 312.

In particular embodiments, an assignment of primary/secondary, and/or other status definitions can occur within an endpoint. In this fashion, a user can configure status definitions, as well as parameters for adjustment, for received audio or other incoming content. In addition, such features can also be utilized for control involving "tokens" for allowing talk or floor control among a group of endpoints.

Figure 4:
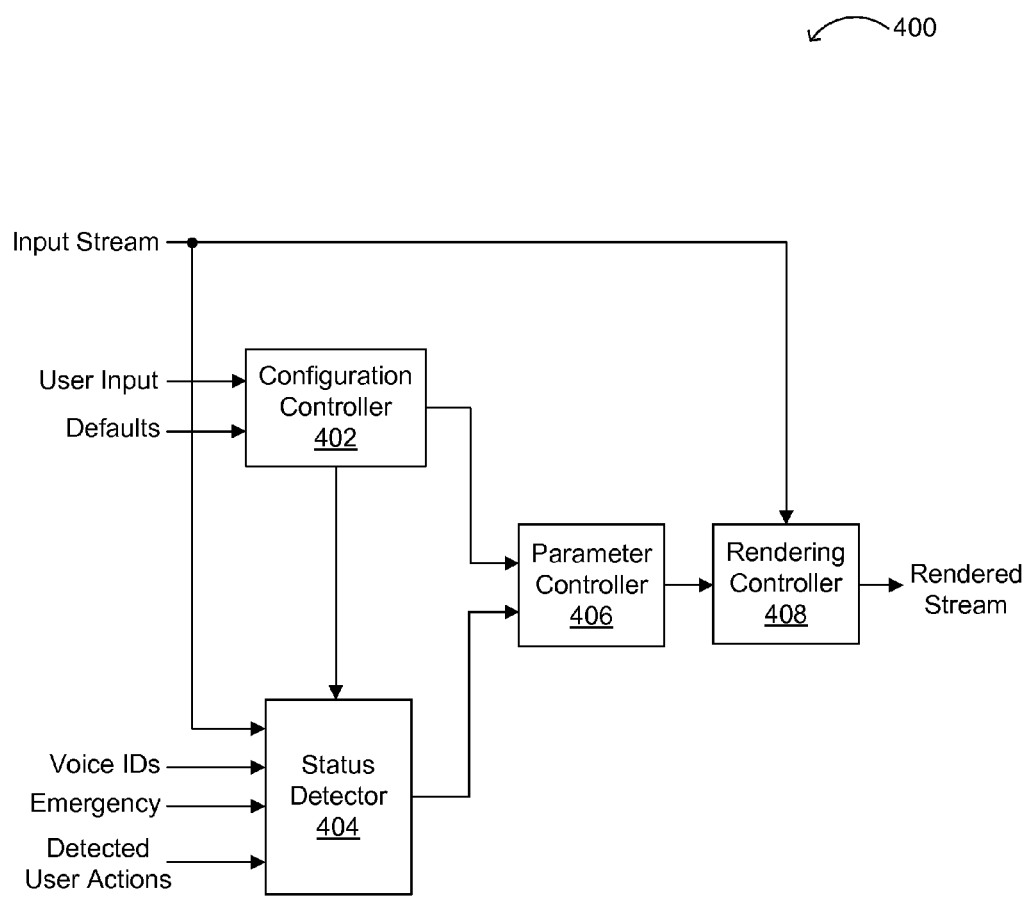
FIG. 4 illustrates example endpoint components.

Referring now to FIG. 4, example endpoint components are shown and indicated by the general reference character 400. Configuration controller 402 can receive user inputs, defaults, or any other suitable configuration information (e.g., from an interoperability server) for definition of predetermined settings. User inputs can allow a local user of an endpoint to configure the endpoint such that parameter adjustment can automatically occur. For example, a user can configure the endpoint such that when another particular endpoint is providing audio, the volume of that rendered audio stream can be increased by 50%. Of course, any other suitable parameter adjustment or change in audio characteristics (e.g., changing from left to right in a stereo configuration) can be accommodated. Thus, an endpoint can be configured to support any suitable parameter adjustments in response to particular status changes.

Status detector 404 can be utilized to determine when the status associated with a particular content stream has changed, thus indicating that a parameter adjustment is to occur. For example, voice/talker IDs, emergency indications, as well as detectable user actions, as may be defined or configured within the endpoint, can be utilized in determining such a status change. Accordingly, status detector 404 can receive some inputs from a user of a particular endpoint (e.g., detected user actions), while others (e.g., voice IDs and emergency indications) may be received from another endpoint. For example, voice IDs and emergency indications may be received via a multicast network, and may be derived from (e.g., via in-band controls), or otherwise associated with the input stream, as discussed above.

Parameter controller 406 can utilize configuration controller 402 and status detector 404 inputs to determine when a parameter is to be adjusted in a rendered stream. Within predetermined settings defined via configuration controller 402, parameter controller 406 can send parameters and/or other control signals to convey which parameters are to be adjusted in a particular rendered stream. Rendering controller 408 can receive an input stream, and may generate a rendered stream version of that input stream using parameters provided by parameter controller 406. Thus, adjusted parameters can result in appropriate changes to the rendered stream. In this fashion, parameters of a rendered stream can be adjusted in response to a status change, based on predetermined settings defined in an endpoint.

Figure 5:
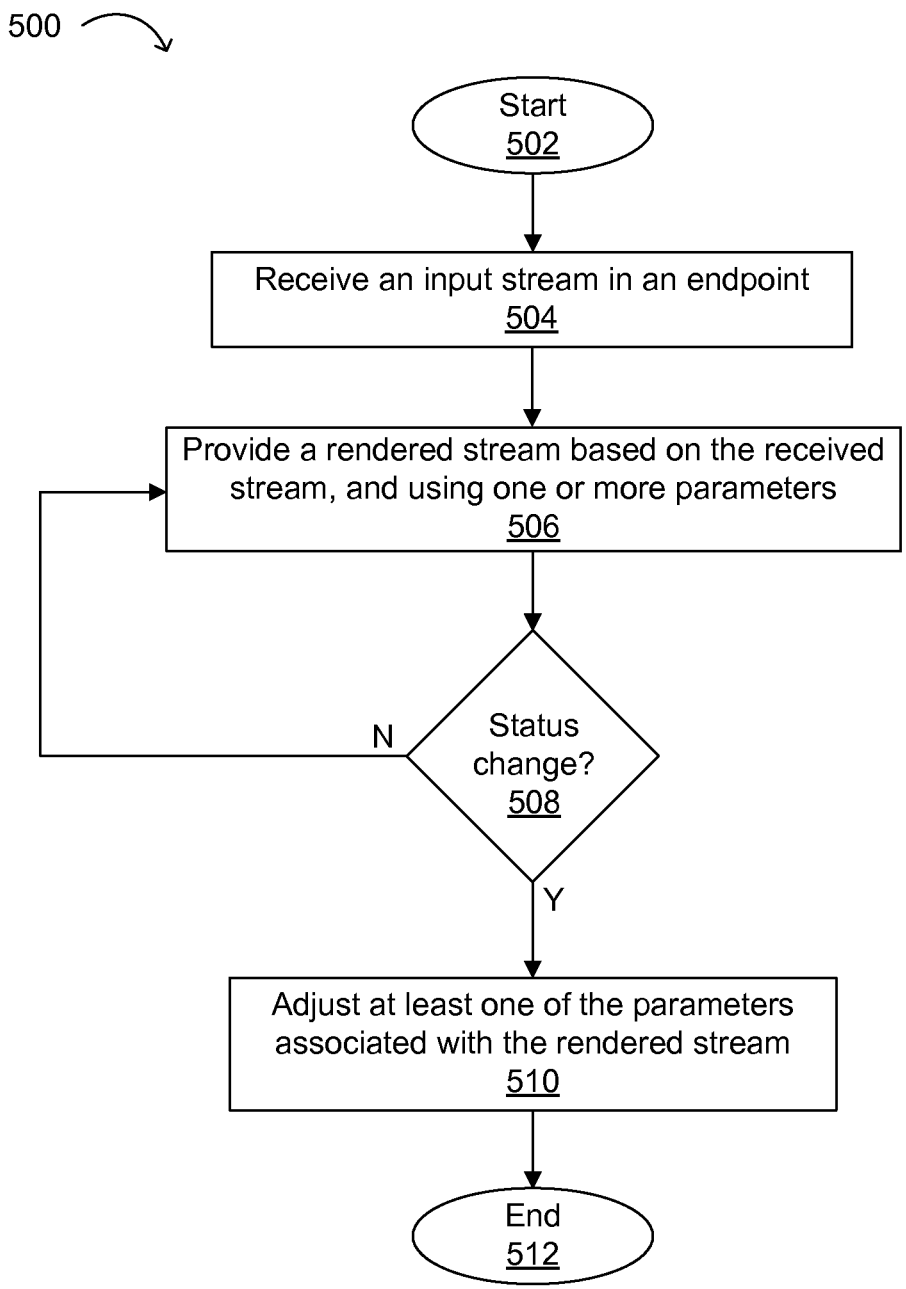
FIG. 5 illustrates an example stream rendering flow.

Referring now to FIG. 5, an example stream rendering flow is shown and indicated by the general reference character 500. The flow can begin (502), and an input stream can be received in an endpoint (504). A rendered stream may be provided based on the received stream, and also using one or more parameters (506). If no status change is detected (508), the stream rendering can continue based on the current parameter state (506). However, if there is a status change (508), at least one of the parameters associated with the rendered stream can be adjusted (510), and the flow can complete (512).

Particular embodiments can also accommodate variations and combinations of these specific examples described above. For example, an endpoint user may listen to a specific VTG as a primary participant at a normal volume via the user's right ear, which may be dedicated to high priority events. The same user may be listening simultaneously to another VTG as a secondary participant at low volume and using the left ear, which may be dedicated to lower priority events.

If a user wants to review the last communication on VTG, he can activate the replay function of this specific VTG, as discussed above. In response, the system can automatically boost the volume to the replay function, thus enabling the user to better hear the details of the recorded discussion. The automatic adjustment of the volume can reduce the number of keystrokes the participant needs to perform as part of invoking the replay function and, as such enhances the end-user experience.

In particular embodiments, a participant may configure primary VTGs to play in a participant's right ear, and secondary VTGs in the left ear. Participants may be divided into interest groups, such as firefighters, police, etc., led by a dispatcher. In particular embodiments, as communication events evolve, the dispatcher may decide to elevate the importance of a given event. To execute on this decision, the dispatcher may move the specific VTG from a left to a right ear. As a result, the system can identify this as an indicator of the increased importance of the specific VTG, and if the volume of this channel is found to be too low, the system can automatically increase its volume.

In particular embodiments, the system may communicate the configuration of the leader, such as the dispatcher, to other users, and as a result of the actions described above, can automatically modify the parameters of the other participants associated with the specific leader. For example, if a fire dispatcher decides that a specific fire needs his full attention and moves the associated communication of this event to his right ear, the system may automatically alert the other firefighters of the event, and also move the relevant VTG to their right ears, or simply increase their volume for this VTG.

In particular embodiments, a secondary participant of a conference call may listen to the conference call in the background using his speakerphone with the volume turned down. This can enable a secondary user to focus on other functions he is simultaneously performing. In the event that the attention of the secondary participant is requested, the secondary participant can pick up the handset and may need to boost the volume of the speaker. In particular embodiments, the system can detect that the user has picked up the handset and determine that the end-user wishes to move from a secondary to a primary participant role. As a result, the system can automatically increase the volume of the microphone to a normal setting, thus facilitating the shifting focus of the participant to the ongoing conference.

In particular embodiments, the system can automatically adjust the rendering parameters in response to specific events, such as a manual event triggered by an endpoint user (e.g., replay), use of a handset versus a headset, a mouse hovering over a certain channel in an endpoint, importance changed by dispatcher, importance changed by policy, a certain participant joining or leaving a VTG, and/or natural language recognition or automatic speech recognition (ASR) detecting a certain phrase or speaker recognition. Other than volume changes as discussed above, the media rendering parameters that may be altered can include panning, pitch, frequency filters, reverberation, fading, etc.

In particular embodiments, parameters can be automatically altered in a communication system in response to state changes. Accordingly, the need for manual parameter adjustment can be reduced, resulting in enhanced end-user experience. Also in particular embodiments, the system can utilize specific end-user state changes as an indicator that a user has moved from being a secondary to a primary participant. The system can modify specific parameters of the endpoint accordingly.

In particular embodiments, a specific feature invocation by an end-user can be an indicator that the importance of a specific VTG is changed. The system can modify the specific parameters of this VTG accordingly. Also in particular embodiments, the system can utilize the activation of the replay function as an indicator that an end-user wishes to focus on hearing the previous communication of a selected VTG.

In particular embodiments, a user picking up his handset can be utilized as an indicator that the participant wants to focus his attention on the ongoing discussion. Also in particular embodiments, a user moving a VTG from the secondary to a primary spatial position can be utilized as an indicator that the user would like to listen more carefully to the communication on this specific VTG.

In particular embodiments, participants can configure at least two specific volumes per channel, such as: one normal setting for primary VTGs and a primary role, and a second lower volume setting for use in secondary VTGs and a secondary role. Also in particular embodiments, the volume of a media stream which has been identified to be of increased importance can be examined. If the system determines that the volume has been sent to the low secondary functionality setting, it can automatically set the volume to an appropriate volume level. Further, the system may be programmed to alter one or more media rendering parameters in response to a variety of system-wide events.

Although the description has been described with respect to particular embodiments thereof, these particular embodiments are merely illustrative, and not restrictive. For example, while audio streams, as well as particular status changes and parameter examples have been described herein, any suitable content stream, status definitions, and/or parameters can be utilized in particular embodiments. Also, any suitable network structures, types of networks, etc., can be utilized in particular embodiments.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory.

Particular embodiments can be implemented in the form of control logic in software or hardware or a combination of both. The control logic, when executed by one or more processors, may be operable to perform that which is described in particular embodiments.

A "processor" or "process" includes any human, hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. An apparatus, comprising:
a configuration controller configured to provide predetermined settings in response to a user input and default settings, wherein the default settings are received from a server, and the user input is configured to change the predetermined settings from the default settings;
a status detector configured to determine a status associated with an input stream that is received by the status detector, wherein the status detector is configured to use a voice identification, an emergency indication, and a detected user action, in the status determination based on the predetermined settings;
a parameter controller configured to adjust a parameter in response to a detected change in the status from the status detector, wherein the adjusted parameter is identified in the predetermined settings; and
a rendering controller configured to receive the input stream, and to provide a rendered stream in response to the input stream and the adjusted parameter.

2. The apparatus of claim 1, comprising a device configured with an Internet protocol, IP, application, wherein the device comprises the configuration controller, the status detector, the parameter controller, and the rendering controller.

3. The apparatus of claim 1, wherein the change in status comprises a change from a secondary participant to a primary participant in a virtual talk group.

4. The apparatus of claim 1, wherein the voice identification is provided in association with the input stream to identify an originator of audio from another apparatus coupled to the server.

5. The apparatus of claim 1, wherein the emergency indication is provided in association with the input stream from another apparatus coupled to the server.

6. The apparatus of claim 1, wherein the detected user action comprises invocation of a voice replay buffer.

7. The apparatus of claim 1, wherein the parameter comprises at least one of a volume setting and a stereo setting.

8. The apparatus of claim 1, wherein the input stream is received via a multicast network.

9. The apparatus of claim 1, wherein the rendered stream comprises a generated version of the input stream, the input stream comprising IP signaling.

10. A method, comprising:
storing predetermined settings in an endpoint in response to a user input and default settings, wherein the default settings are received from a server, and the user input is configured to change the predetermined settings from the default settings;
receiving an input stream at a status detector and a rendering controller in the endpoint;
adjusting a parameter when a status associated with the input stream changes, wherein the status is determined in the status detector using a voice identification, an emergency indication, and a detected user action, based on the predetermined settings; and
providing a rendered stream in response to the input stream and the adjusted parameter, wherein the adjusted parameter is identified in the predetermined settings.

11. The method of claim 10, wherein the voice identification is provided in association with the input stream to identify an originator of audio from another endpoint coupled to the server.

12. The method of claim 10, wherein the emergency indication is provided in association with the input stream from another endpoint coupled to the server.

13. The method of claim 10, wherein the detected user action comprises invocation of a voice replay buffer.

14. The method of claim 10, wherein the adjusting the parameter comprises changing at least one of a volume setting and a stereo setting.

15. The method of claim 10, wherein the receiving the input stream in the endpoint comprises receiving the input stream from a multicast network, the input stream comprising Internet protocol, IP, signaling.

16. A system, comprising:
a plurality of endpoints coupled via a network; and
an interoperability server coupled to each of the plurality of endpoints, wherein at least one of the endpoints comprises:
a configuration controller configured to provide predetermined settings in response to a user input and default settings, wherein the default settings are received from the interoperability server, and the user input is configured to change the predetermined settings from the default settings;
a status detector configured to determine a status associated with an input stream that is received by the status detector, wherein the status detector is configured to use a voice identification, an emergency indication, and a detected user action, in the status determination based on the predetermined settings;
a parameter controller configured to adjust a parameter in response to a detected change in the status from the status detector, wherein the adjusted parameter is identified in the predetermined settings; and
a rendering controller configured to receive the input stream, and to provide a rendered stream in response to the input stream and the adjusted parameter.

17. The system of claim 16, wherein the voice identification is provided in association with the input stream to identify an originator of audio from another endpoint coupled to the server.

18. The system of claim 16, wherein the emergency indication is provided in association with the input stream from another of the plurality of endpoints coupled to the interoperability server.

19. The system of claim 16, wherein the detected user action comprises invocation of a voice replay buffer.

20. The system of claim 16, wherein the parameter comprises at least one of a volume setting and a stereo setting.

21. The system of claim 16, wherein the network comprises a multicast network, the input stream comprising Internet protocol, IP, signaling.

22. An endpoint, comprising:
a processor; and
a memory that includes instructions, wherein the endpoint is configured for:

storing predetermined settings in response to a user input and default settings, wherein the default settings are received from a server, and the user input is configured to change the predetermined settings from the default settings;

receiving an input stream in the endpoint at a status detector and a rendering controller;

adjusting a parameter when a status associated with the input stream changes, wherein the status is determined in the status detector using a voice identification, an emergency indication, and a detected user action, based on the predetermined settings; and providing a rendered stream in response to the input stream and the adjusted parameter, wherein the adjusted parameter is identified in the predetermined settings.

* * * * *